United States Patent
Sudo

(10) Patent No.: US 7,030,903 B2
(45) Date of Patent: Apr. 18, 2006

(54) IMAGE DISPLAY SYSTEM, INFORMATION PROCESSING APPARATUS, AND METHOD OF CONTROLLING THE SAME

(75) Inventor: Toshiyuki Sudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/025,856

(22) Filed: Feb. 19, 1998

(65) Prior Publication Data
US 2001/0012054 A1  Aug. 9, 2001

(30) Foreign Application Priority Data
Feb. 20, 1997  (JP) .............................. 9-036328

(51) Int. Cl.
*H04N 13/04*  (2006.01)

(52) U.S. Cl. .............................. 348/51; 348/53; 348/54; 348/59

(58) Field of Classification Search .................. 348/51, 348/52, 53, 54, 55, 56, 57, 58, 59; 351/201; 359/464, 2
See application file for complete search history.

(56) References Cited

U.S. PATENT DOCUMENTS

| | | | |
|---|---|---|---|
| 5,315,377 A | * 5/1994 | Isono et al. ................... 348/51 |
| 5,589,956 A | 12/1996 | Morishima et al. ............ 359/15 |
| 5,625,493 A | 4/1997 | Matsumura et al. ......... 359/630 |
| 5,694,229 A | * 12/1997 | Drinkwater et al. ............. 395/2 |
| 5,825,456 A | * 10/1998 | Tabata et al. ................ 351/201 |
| 5,825,541 A | * 10/1998 | Imai ............................. 359/464 |
| 5,875,055 A | * 2/1999 | Morishima et al. ........... 348/57 |
| 5,930,037 A | * 7/1999 | Imai ............................. 348/51 |
| 5,943,166 A | * 8/1999 | Hoshi et al. .................. 348/51 |

FOREIGN PATENT DOCUMENTS

| | | |
|---|---|---|
| DE | 195 00 699 | 7/1996 |
| EP | 0 540 137 | 5/1993 |
| EP | 0 656 555 | 6/1995 |
| EP | 0 721 131 | 7/1996 |
| JP | 3-119889 | 5/1991 |
| JP | 5-122733 | 5/1993 |
| JP | 8-327948 | 12/1996 |
| JP | 9-101482 | 4/1997 |

OTHER PUBLICATIONS

H. Isono, et al., "Autostereoscopic 3–D Display Using LCD–Generated Parallax Barrier," Electronics, vol. 76, No. 7, pp. 77–83 (Jul. 1, 1993).
S.H. Kaplan, "Theory of Parallax Barriers", Journal of the SMPTE, vol. 59, No. 7, pp. 11–21 (1952).

* cited by examiner

*Primary Examiner*—Allen Wong
(74) *Attorney, Agent, or Firm*—Fitzpatrick, Cella, Harper & Scinto

(57) ABSTRACT

A stereoscopic image display apparatus for displaying a stereoscopic image, which is obtained by alternately arranging stripe parallax images R and L corresponding to the right and left eyes, in a window includes a parallax barrier for a stereoscopic vision. When the display position of a window including a stereoscopic image which is set after the window is opened or moved and the positions of the right-eye and left-eye stripes of a parallax barrier have a relationship which does not allow a proper stereoscopic vision, the display position of the window is moved by one stripe in the horizontal direction.

26 Claims, 18 Drawing Sheets

IMAGE DISPLAY SYSTEM, INFORMATION PROCESSING APPARATUS, AND METHOD OF CONTROLLING THE SAME

BACKGROUND OF THE INVENTION

1. Field of the Invention

The present invention relates to a stereoscopic display apparatus which allows an observer to observe a stereoscopic image by using the parallax between the right and left eyes, an information processing apparatus, a host computer for controlling the display apparatus, and a method therefor, thereby providing an operation environment for comfortable stereoscopic display.

2. Related Background Art

In general, a stereoscopic image display apparatus of the parallax barrier scheme is known well as an apparatus for displaying a stereoscopic image. The parallax barrier scheme is disclosed in S. H. Kaplan, "Theory of Parallax Barriers.", J. SMPTE, Vol. 59, No. 7, pp. 11–21 (1952). According to this scheme, a striped image obtained by alternately arranging at least right and left images of a plurality of parallax images from a plurality of viewpoints into a vertically striped pattern is observed through a slit pattern (called a parallax barrier) having predetermined opening portions placed at a predetermined distance from this image. With this operation, the observer observes images corresponding to the respective eyes with the corresponding eyes. Japanese Patent Laid-Open Nos. 3-119889 and 5-122733 disclose stereoscopic display apparatuses in which a parallax barrier is electronically generated by a transmission type liquid crystal display device and the like, and the shape and position of each stripe are variably controlled to improve the compatibility with conventional 2D image display apparatuses.

FIG. 19 shows the basic arrangement of the stereoscopic image display apparatus disclosed in Japanese Patent Laid-Open No. 3-119889. This stereoscopic image display apparatus includes a transmission type liquid crystal display apparatus 101 for displaying images and an electronic parallax barrier 103 constituted by a transmission type liquid crystal display placed on the liquid crystal display apparatus 101 sandwiching a spacer 102 having a thickness d.

The transmission type liquid crystal display apparatus 101 displays a vertically striped image consisting of parallax images sensed from two or more directions. A parallax barrier pattern is formed at an arbitrary position on the barrier surface of the electronic parallax barrier 103 upon designation of X and Y addresses by a control means such as a microcomputer, thereby allowing a stereoscopic vision based on the principle of the above parallax barrier scheme. Note that when this electronic parallax barrier is made colorless and transparent throughout the entire image display area, a 2D image can be displayed, thus realizing the compatibility between the 2D display and 3D display.

An apparatus capable of performing mixed display of 3D and 2D images within a single frame is disclosed in Japanese Patent Laid-Open No. 5-122733. In this apparatus, as shown in FIGS. 20A and 20B, a striped barrier pattern can be generated only in a partial area of the electronic parallax barrier 103.

The lenticular scheme is also known widely as a means for displaying a stereoscopic image by using the parallax between the right and left eyes of an observer as in the parallax barrier scheme. In the lenticular scheme, a lenticular lens constituted by an array of many semicylindrical lenses is placed on the front surface of a display to spatially separate an image into images for the right and left eyes, thereby allowing the observer to observe a stereoscopic image. In the display of the lenticular scheme as well, an image displayed on the screen is a vertically striped image obtained by alternately arranging right and left images.

As a stereoscopic display using a horizontally striped image obtained by alternately arranging right and left images, Cyberbook (trademark) is available from Vrex Inc. In this display, as shown in FIG. 21, a striped polarizing plate 202 obtained by alternately arranging two types of polarizing plates, whose polarization axis directions are perpendicular to each other, in units of horizontal lines is placed on the front surface of the liquid crystal display of a notebook personal computer 201. A displayed image is observed through polarization glasses 203 having the two types of polarizing plates corresponding to those used for the striped polarizing plate 202 arranged for the right and left eyes. (In FIG. 21, the arrows indicate polarizing direction of the polarizing direction of the polarizing plates.) With this arrangement, of the displayed image, lines to be seen with the right and left eyes of the observer can be separated/selected. For example, the odd lines of the liquid crystal display are used as right-eye image display lines, and the even lines are used as left-eye image display lines to allow the observer to separately observe images formed by the respective lines with the corresponding eyes.

Various environments in which 3D displays are used can be conceived. Assume that an entire screen is occupied by a single type of image as in the case of a television set. In this case, the relative positional relationship between a displayed image and each constituent element of the apparatus always remains the same. Once, therefore, the observer sets his/her eyes at an optimal observation position, he/she can continuously obtain a proper stereoscopic vision. Assume that a plurality of windows are opened on one screen, and images are to be displayed in the respective windows like images handled in a computer. In this case, as the positions of the windows change, the relationship between each image and each constituent element of the apparatus changes. As a result, the optimal observation position changes, and hence the observer cannot always obtain a proper stereoscopic vision.

When, for example, a barrier 1 of the parallax barrier scheme and a striped image 2 displayed on the image display apparatus maintain a proper relative positional relationship, as shown in FIG. 22, light forming an image for the left eye propagates to a left eye 3, and light forming an image for the right eye propagates to a right eye 4. As a result, the observer can properly recognize a stereoscopic image.

If, however, the relative positions of the barrier 1 and the striped image 2 displayed on the image display apparatus are shifted by one pitch in the horizontal direction with respect to the positions in FIG. 22, as shown in FIG. 23, light forming an image for the left eye propagates to the right eye 4, and light forming an image for the right eye propagates to the left eye 3. As a result, a "reversed stereoscopic vision" for the observer is produced.

When a plurality of windows are opened, and stereoscopic images are displayed in the respective windows, in particular, stereoscopic visions may be properly produced in some windows, but reversed stereoscopic visions may be produced in other windows.

When windows are opened, and images are displayed in the respective windows in this manner, since the relative positions of the barrier 1 and the striped image 2 are likely to change, the possibility of the occurrence of a reversed stereoscopic vision is high. This tendency applies to any stereoscopic display scheme, as well as the parallax barrier scheme, in which the relative positional relationship between a displayed image and other optical parts is important.

The same applies to Cyberbook available from Vrex, which uses a "horizontally striped" parallax image as a striped image. In this case, when, for example, the relative positions of a striped polarizing plate and a striped image displayed on the image display apparatus are shifted by one pitch in the vertical direction, a reversed stereoscopic vision is produced.

SUMMARY OF THE INVENTION

The present invention has been made in consideration of the above problems, and has as its object to provide an image display system and an information processing apparatus which can always allow a proper stereoscopic vision by controlling the arrangement of the stripe parallax images of a stereoscopic image displayed in a window to be suited to a display apparatus, and a method of controlling the system and the apparatus.

It is another object of the present invention to provide an information processing apparatus and method which can always allow an observer to have a proper stereoscopic vision even with a change in the position of each window when several windows are opened on the screen, and images are displayed in the windows like images handled in a computer.

It is still another object of the present invention to allow a stereoscopic vision in units of windows.

It is still another object of the present invention to always allow a proper stereoscopic vision without changing the contents displayed in a window.

It is still another object of the present invention to always allow a proper stereoscopic vision without changing the display position of a window.

It is still another object of the present invention to allow a proper stereoscopic vision while a window is moved.

According to an aspect of the present invention, in order to achieve the above objects, there is provided an image display system capable of performing stereoscopic display, comprising stereoscopic image display means for displaying a stereoscopic image having stripe parallax images arranged for right and left eyes, stereoscopic vision control means for controlling directivity of the stereoscopic image such that stripe images of the stereoscopic image are respectively observed with the right and left eyes, and changing means for, when a relative positional relationship between the stereoscopic image and the stereoscopic vision control means is not a proper relationship with which an observer can obtain a proper stereoscopic vision, changing the relative positional relationship to realize a proper stereoscopic vision.

According to another aspect of the present invention, there is provided an information processing apparatus which can be connected to an image display apparatus having stereoscopic vision control means for controlling directivity of a stereoscopic image to allow an observer to observe stripe images of the stereoscopic image with right and left eyes of the observer, respectively, comprising generation means for generating image data including a window in which stripe parallax images corresponding to the right and left eyes are arranged, determination means for determining whether a relative positional relationship between the window and the stereoscopic vision control means of the image display apparatus is a proper positional relationship which allows a proper stereoscopic vision, and adjustment means for, when the determination means determines that the relationship is not the proper relationship which allows a proper stereoscopic vision, adjusting the relative positional relationship to allow a proper stereoscopic vision.

According to still another aspect of the present invention, there are provided control methods for the above image display system and information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Each of the following embodiments will exemplify a stereoscopic display apparatus for allowing an observer to observe a stereoscopic image by using the parallax between the right and left eyes and a computer system including a host computer for controlling the stereoscopic display apparatus.

Figure 1:
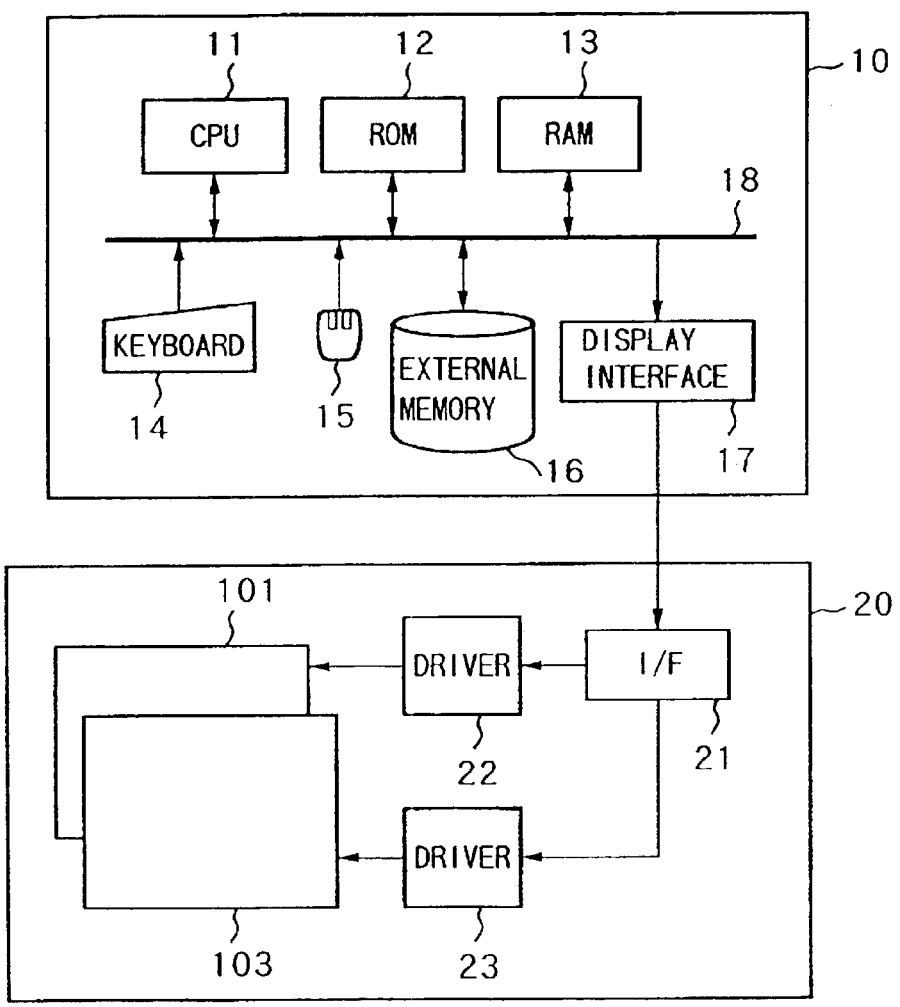
FIG. 1 is a block diagram showing the arrangement of a computer system according to the first embodiment of the present invention.

FIG. 1 is a block diagram showing the arrangement of a computer system according to the first embodiment. Referring to FIG. 1, reference numeral 10 denotes a host computer; 20, a stereoscopic display apparatus; 11, a CPU for realizing various types of control operations performed by the host computer 10; 12, a ROM storing a boot program, which is executed when the CPU 11 is started, and various types of data; and 13, a RAM which serves as a main memory for storing control programs executed by the CPU 11 and provides a work area used when the CPU 11 executes various types of control operations. Reference numerals 14 and 15 respectively denote a keyboard and a pointing device, which are used to input commands from the user. Reference numeral 16 denotes an external memory such as a hard disk, which is used to store various application programs and data. Note that each application program stored in the external memory 16 is loaded into the main memory area of the RAM 13 when it is executed by the CPU 11. Reference numeral 17 denotes a display interface, which is connected to the stereoscopic display apparatus 20 in this embodiment; and 18, a bus for connecting the respective components of the host computer 10 to each other.

Figure 19:
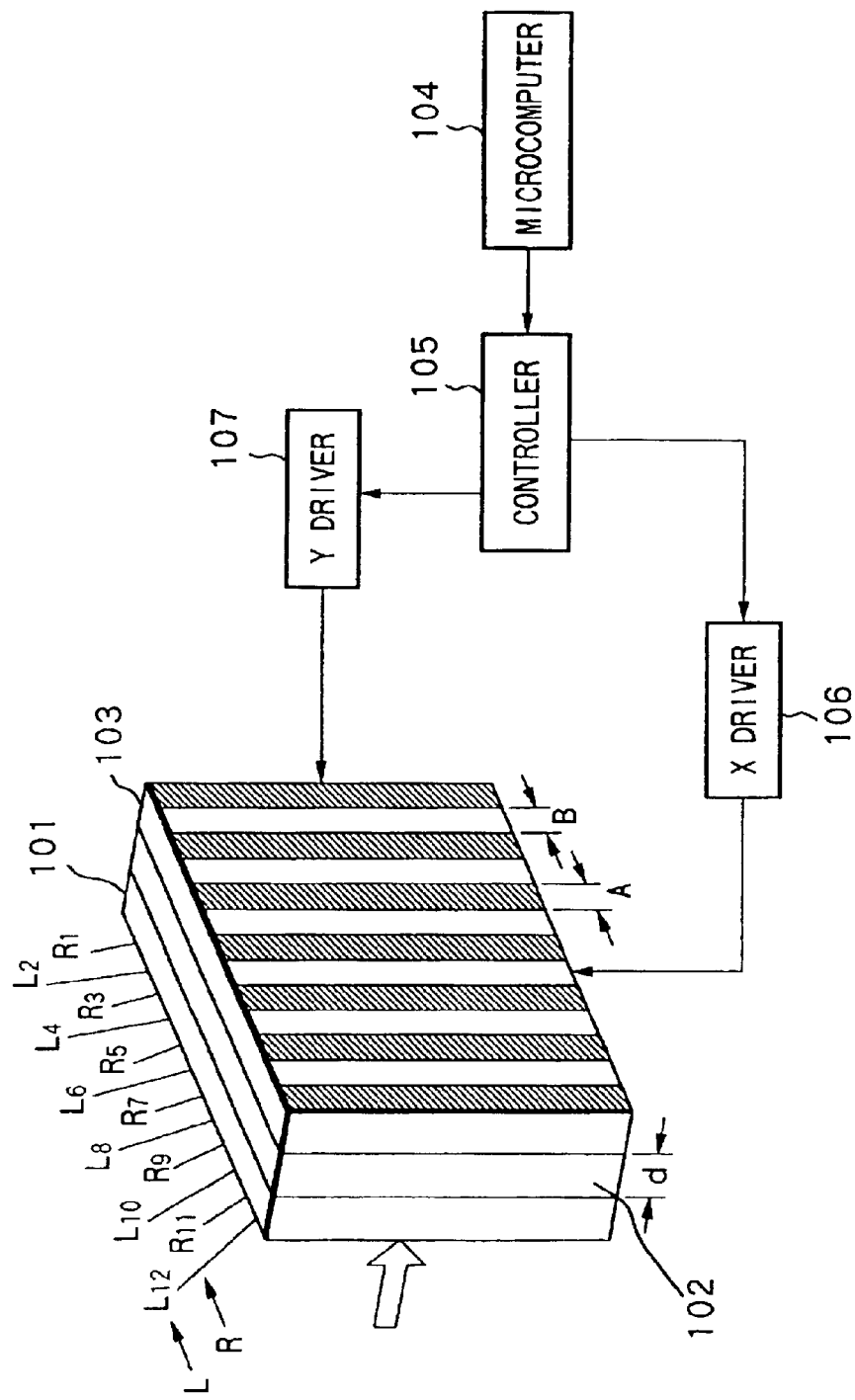
FIG. 19 is a view showing the basic arrangement of the stereoscopic image display apparatus disclosed in Japanese Patent Laid-Open No. 3-119889.
Figure 20A:
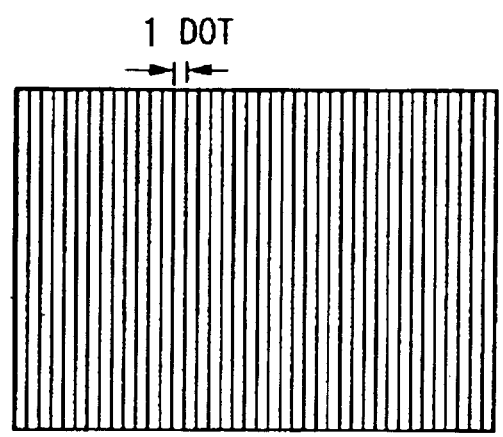
FIGS. 20A and 20B are views for briefly explaining the stereoscopic image display apparatus disclosed in Japanese Patent Laid-Open No. 5-122733.
Figure 20B:
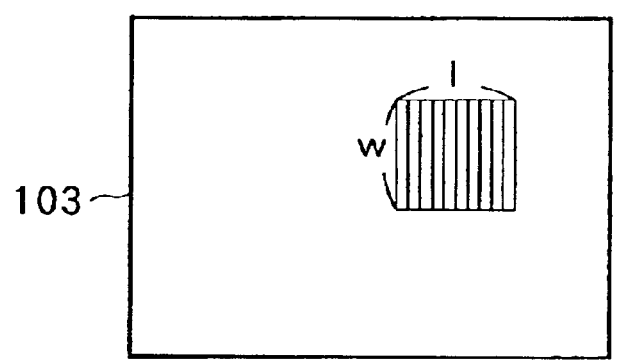

The stereoscopic display apparatus 20 includes an interface 21 for receiving a video signal and position information indicating a stereoscopic display position from the host computer 10. Note that the video signal and the position information are respectively supplied to drivers 22 and 23. The driver 22 controls a transmission type liquid crystal display 101 of the stereoscopic display apparatus on the basis of the input video signal to display an image corresponding to the video signal. The driver 23 controls an electronic parallax barrier 103 on the basis of the input position information to display a parallax barrier pattern in the stereoscopic display area indicated by the position information. Note that the transmission type liquid crystal display 101 and the electronic parallax barrier 103 are the same as those described with reference to FIG. 19. When the electronic parallax barrier 103 is driven, the stripes of the parallax barrier pattern are formed at fixed positions. That is, the display area for the barrier pattern is controlled in accordance with position information, but the positions at which the black stripes can be produced are fixed.

The communication unit constituted by the above interfaces 17 and 21 transmits the above video signal and position information. This communication unit may be a combination of a conventional video interface and serial interface (RS232C or the like) or a dedicated interface. In addition, the dedicated interface may use unused connector pins of a conventional video interface.

Note that above video signal includes both a general 2D image and a 3D image allowing a stereoscopic vision (e.g., the above striped image constituted by two types of parallax images). In this embodiment, 2D and 3D images are displayed in units of windows. In addition, the above position information indicates the size and position of the area in which the above stereoscopic image is present. If, therefore, a parallax barrier pattern is displayed in the area, of the electronic parallax barrier 103, which is indicated by position information, and the image based on a video signal is displayed on the transmission type liquid crystal display 101, the 3D image contained in the video signal can be stereoscopically viewed, and the general 2D image can be properly displayed.

Figure 21:
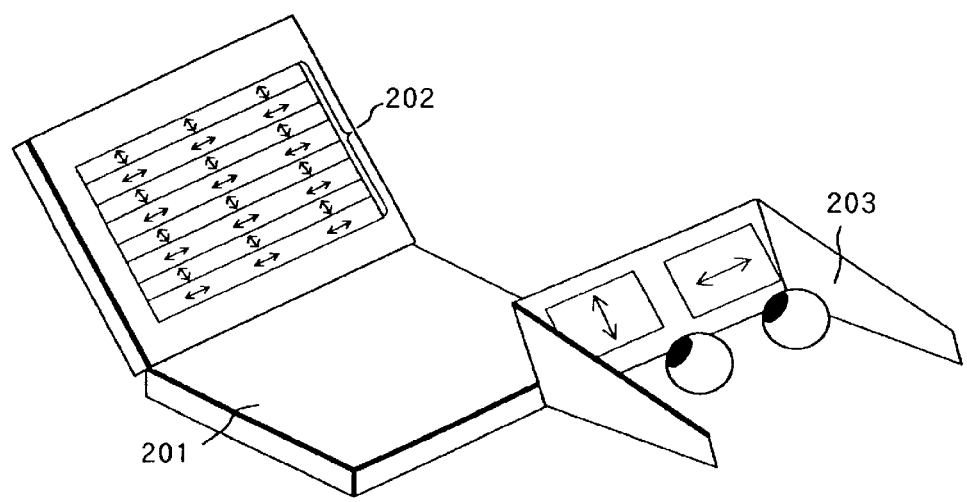
FIG. 21 is a perspective view for briefly explaining a stereoscopic image display apparatus using Cyberbook (trademark)

In this embodiment, an apparatus using the parallax barrier scheme will be mainly described. As is obvious, however, the present invention can also be applied to the Cyberbook (trademark) scheme described with reference to FIG. 21. Note that the Cyberbook scheme does not require the above position information because the host computer 10 and the stereoscopic display apparatus 20 are integrated.

Figure 2:
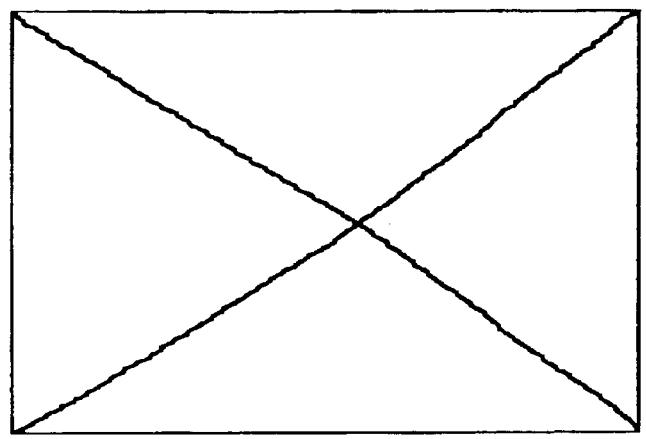
FIG. 2 is a view showing an image for the left eye.
Figure 3:
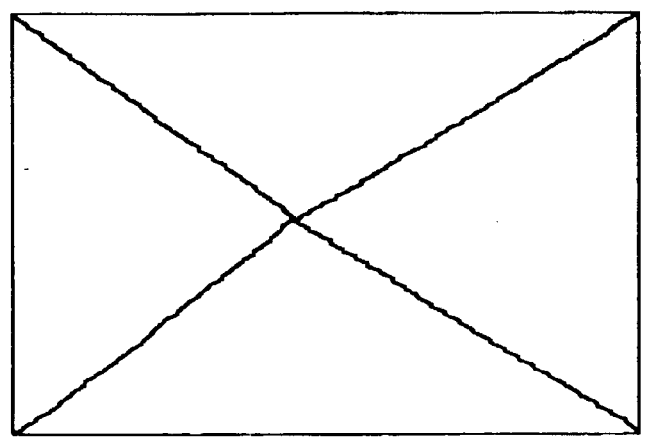
FIG. 3 is a view showing an image for the right eye.

In a stereoscopic display apparatus designed to allow the observer to observe a stereoscopic image by using the parallax between the right and left eyes, the images to be displayed on the image display screen are roughly classified into two types, i.e., a vertically striped parallax image and a horizontally striped parallax image. These images will be further described below. For example, FIG. 2 shows an image for the left eye; and FIG. 3, an image for the right eye. A vertically striped parallax image is obtained by dividing the images in FIGS. 2 and 3 into vertical stripes, and alternately arranging and synthesizing them. A horizontally striped image is obtained by dividing the images in FIGS. 2 and 3 into horizontal stripes, and alternately arranging and synthesizing them (referring to FIGS. 4 and 5, reference symbols L and R denote images for the left and right eyes, respectively).

Figure 22:
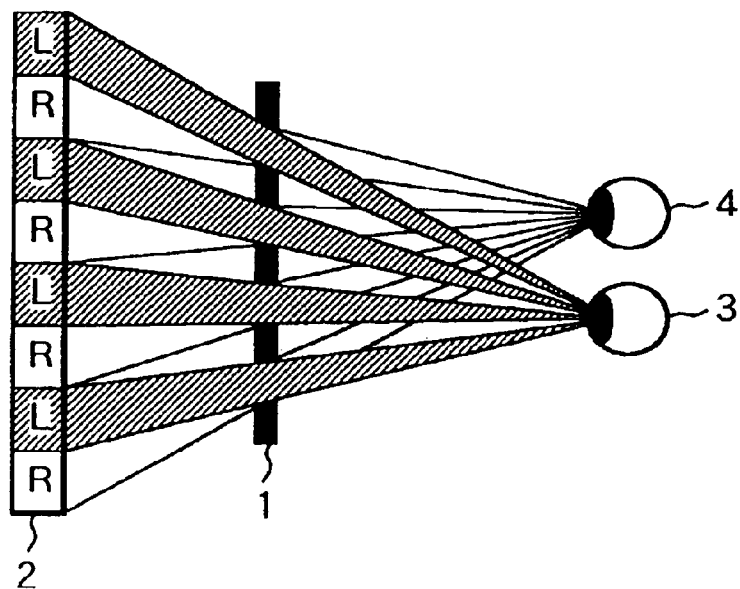
FIG. 22 is a view showing a state in which the relative positions of a barrier and a striped image in the parallax barrier scheme have a proper relationship.
Figure 23:
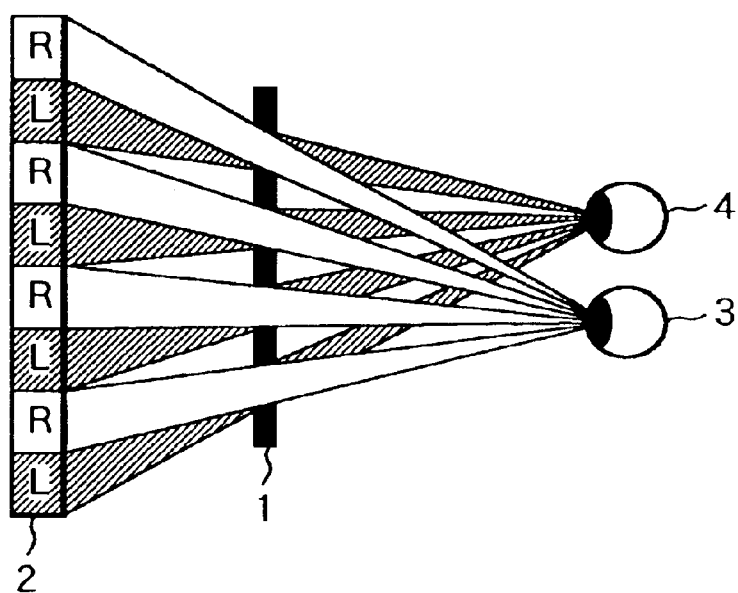
FIG. 23 is a view showing a state in which the relative positions of the barrier and the striped image in the parallax barrier scheme have an improper relationship.

Each striped image can be divided into right and left images when combined with a directivity control means such as a barrier, a lenticular lens, or a striped polarizing plate. If, however, the directivity control means and a striped image are not set at proper relative positions, the right and left images are not observed with the corresponding eyes, as described with reference to FIGS. 22 and 23. Since the directivity control means is a component incorporated in the stereoscopic display apparatus, the position of the means is basically fixed. In general, when an image is to be handled in a computer, a window which can be moved to an arbitrary position is opened, and the image is displayed in the window. For this reason, the directivity control means and the striped image may not be set at proper relative positions depending on the position of the window.

Figure 6:
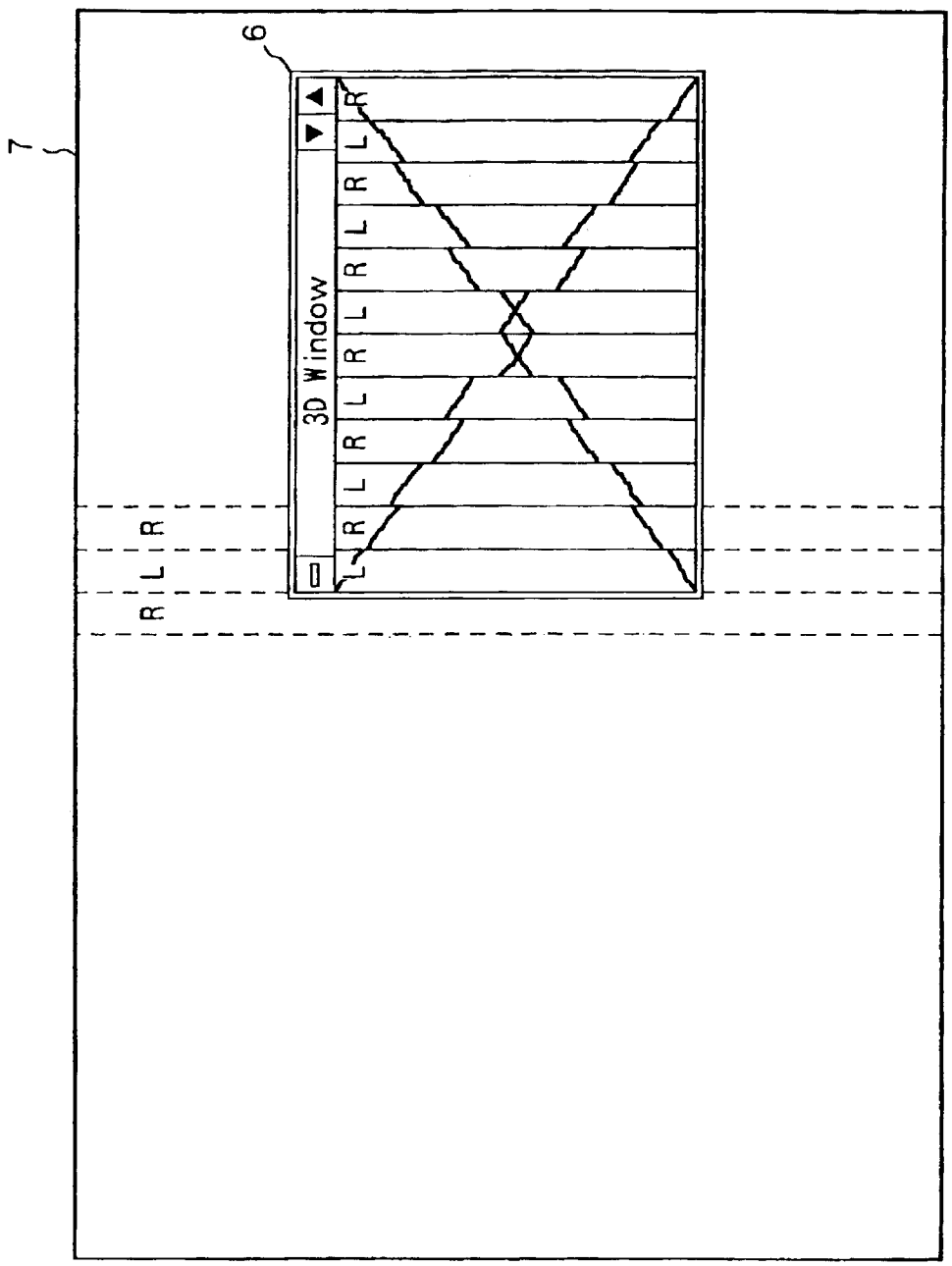
FIG. 6 is a view showing a state in which the positions of right and left stripe images defined by a directivity control means in accordance with the display position of a window for displaying a stereoscopic image coincide with the right and left stripes of the stereoscopic image.

Assume that in a stereoscopic display apparatus using vertically striped parallax images, right-eye strip images (the areas indicated by "R" and surrounded with the solid lines in a window 6) are superimposed on the right-eye image display areas (the areas indicated by "R" and surrounded with the dotted lines in a screen 7) of the directivity control means (coinciding with the screen 7 when viewed from the front surface side), as shown in FIG. 6. In this case, the observer can obtain a proper stereoscopic vision. In contrast to this, assume that the window 6 for displaying an image is located at the position in FIG. 7 within the screen 7, and the right-eye strip images (the areas indicated by "R" and surrounded with the solid lines in the window 6) are superimposed on the left-eye image display areas (the areas indicated by "L" and surrounded with the dotted lines in the screen 7) of the directivity control means. In this case, the observer cannot obtain a proper stereoscopic vision, but has a reversed stereoscopic vision (the left-eye image is seen with the right eye, and the right-eye image is seen with the left eye).

Figure 7:
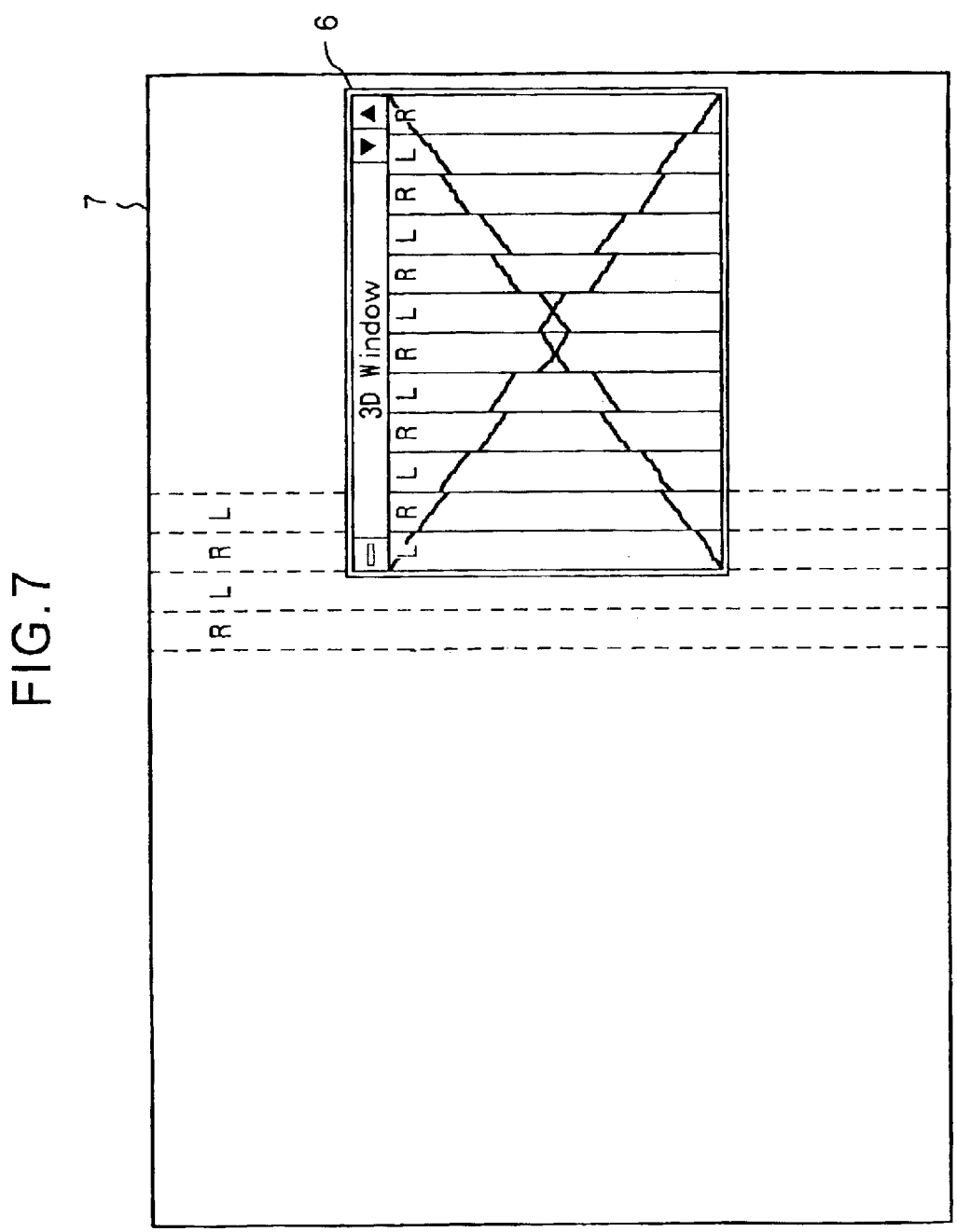
FIG. 7 is a view showing a state in which the positions of right and left stripe images defined by a directivity control means in accordance with the display position of a window for displaying a stereoscopic image do not coincide with the right and left stripes of the stereoscopic image.
Figure 8:
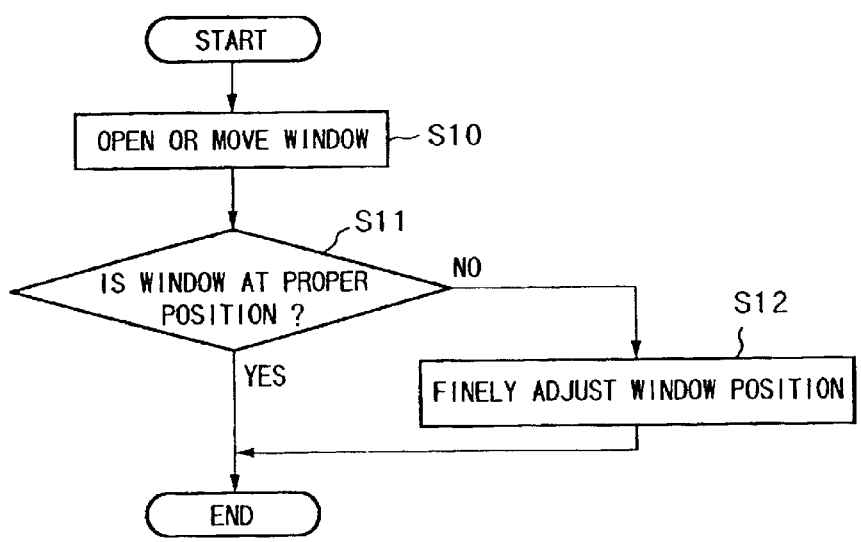
FIG. 8 is a flow chart showing an operation procedure performed by a host computer in the first embodiment.

To eliminate this inconvenience, in this embodiment, the following control is performed by the computer. FIG. 8 is a flow chart showing an operation procedure performed by the host computer in the first embodiment. In step S10, the host computer 10 detects that a window for stereoscopic image display is opened or its position is moved. In step S11, the host computer 10 checks the position of the window after it is opened or moved to detect whether the window is at a proper position for a stereoscopic vision. That is, if the right-eye and left-eye image display areas determined with respect to the screen 7 coincide with the display positions of the respective images in the window 6, as shown in FIG. 6, the host computer 10 determines that the window is at the proper position. If the right-eye and left-eye image display areas determined with respect to the screen 7 do not coincide with the display positions of the respective images in the window 6, as shown in FIG. 7, the host computer 10 determines that the window is at an improper position. Upon determining that the window is at the proper position, the host computer 10 continues the display state. Otherwise, the flow advances to step S12 to automatically perform fine adjustment of the window position. Although not shown in the flow chart, if the opened or moved window is not for stereoscopic image display, the flow does not advance to step S11 and the subsequent steps.

A method of detecting the generation or movement of a window and checking its position depends on the OS, the application, or the like used in the computer. Assume that an application which operates on "Windows 3.1" (trademark), which is an OS available from Microsoft Corporation, is to be created by using Visual Basic Ver.2.0 (trademark), which is an application development language available from Microsoft Corporation. In this case, a window is recognized as an object called "Form". The generation of a window is defined as an event represented by Form_Load(), and the movement of a window is defined as an event represented by Form_Paint(). If, therefore, a program is created such that when the execution of each event is confirmed, a function for detecting the position of the window (Form) is called, the current position of the window which is moved or generated can be obtained.

Figure 9:
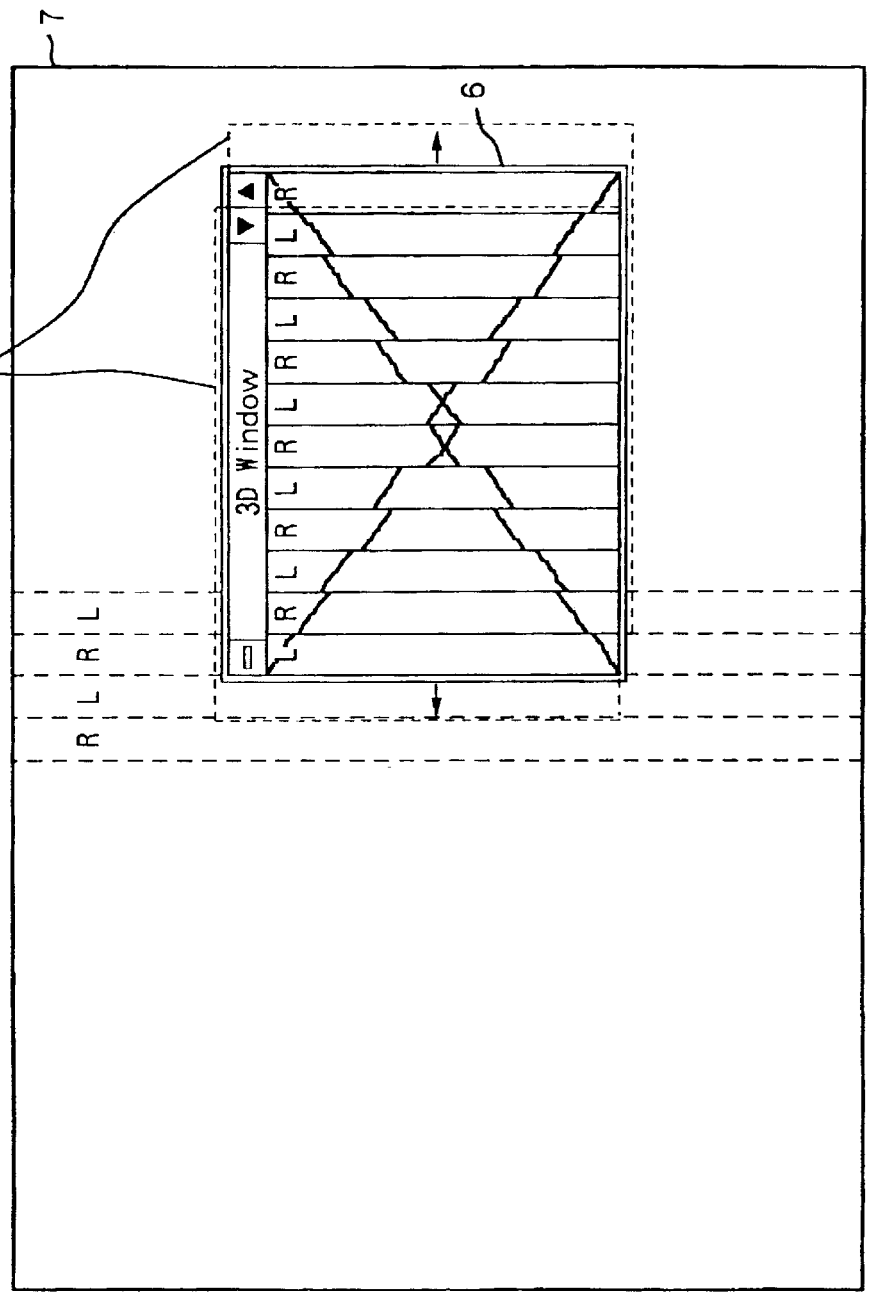
FIG. 9 is a view for explaining fine adjustment of a window position for a vertically striped parallax image.
Figure 10:
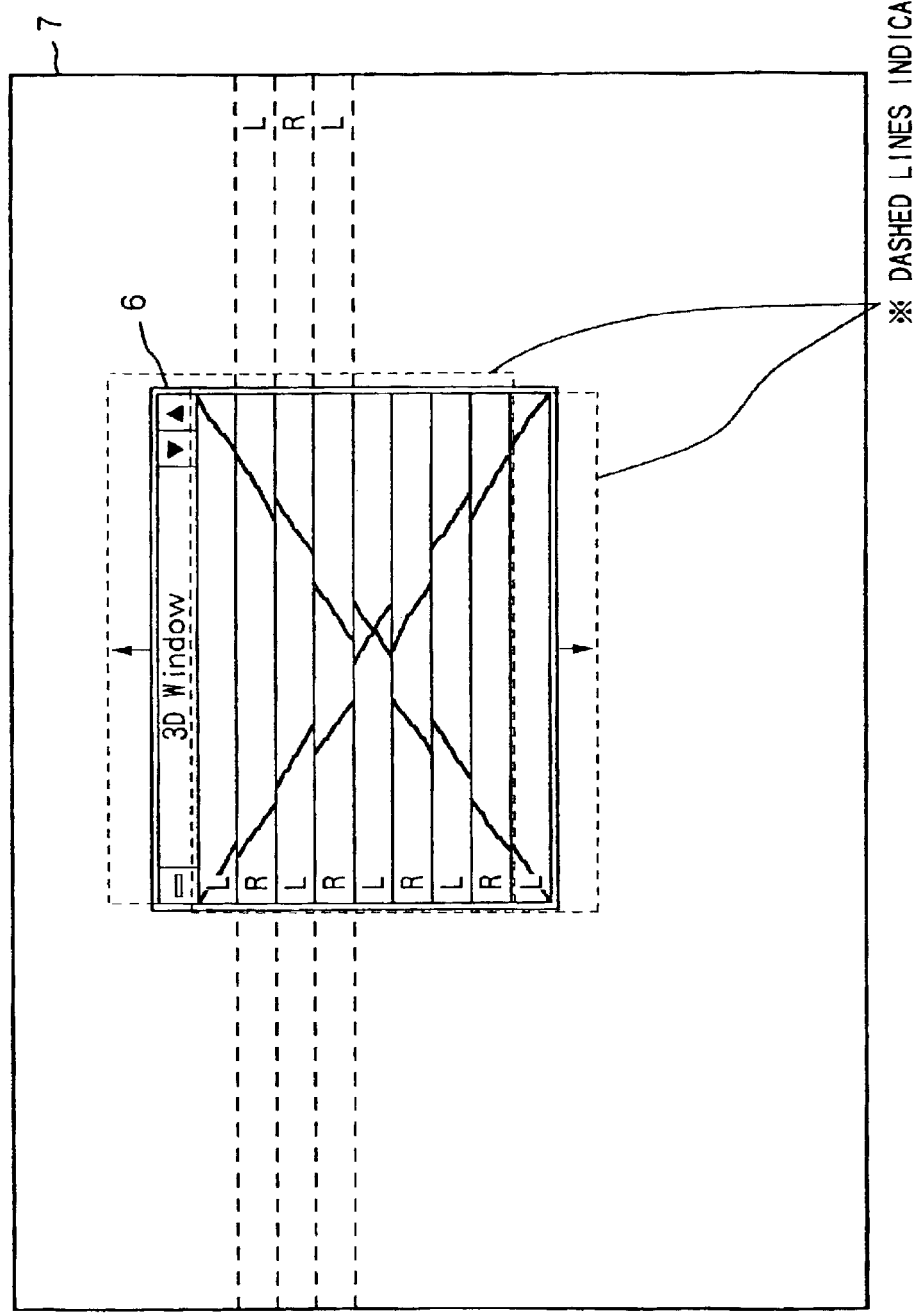
FIG. 10 is a view for explaining fine adjustment of a window position for a horizontally striped parallax image.

A method of finely adjusting the position of a window will be described next with reference to FIGS. 9 and 10. FIG. 9 explains fine adjustment of a window position for a vertically striped parallax image. FIG. 10 explains fine adjustment of a window position for a horizontally striped parallax image.

When a vertically striped parallax image is to be displayed, the window is moved to the right or left by one stripe pitch in the horizontal direction, as shown in FIG. 9. In many cases, the period of stripe images coincides with the minimum pixel pitch of an image display surface. In this case, therefore, it suffices if the window is moved to the right or left by one pixel. With this operation, the reversed stereoscopic vision state is corrected to the proper stereoscopic vision state.

When a horizontally striped parallax image is to be displayed, the window is moved up or down by one stripe pitch in the vertical direction within the screen, as shown in FIG. 10. In many cases, the period of stripe images coincides with the minimum pixel pitch of the image display surface. In this case, therefore, it suffices if the window is moved up or down by one pixel. With this operation, the reversed stereoscopic vision state is corrected to the proper stereoscopic vision state.

Assume that assignment information determined by the relative positional relationship with the electronic parallax barrier 103 as a directivity control means and indicating the assignment of positions, on the transmission type liquid crystal display 101, where images for the right and left eyes are to be displayed are stored in the memory of the host computer 10 in advance. The determination processing in step S11 is performed on the basis of this assignment information. The assignment information may be notified from the stereoscopic display apparatus 20 by communication, or may be held in a driver program added to the stereoscopic display apparatus 20.

When a window is automatically moved in this manner, the amount of movement is very small in most cases. For this reason, such movement is hardly recognized by the observer.

As described above, according to the first embodiment, there is provided a stereoscopic display which can automatically maintain a proper stereoscopic vision without attracting the observer's attention.

<Second Embodiment>

The second embodiment of the present invention will be described next. In the second embodiment as well, the present invention is applied to a stereoscopic display apparatus 20 which allows an observer to observe a stereoscopic image by using the parallax between the right and left eyes and a computer system including a host computer 10 for controlling the display apparatus.

In the first embodiment, a proper stereoscopic vision state is maintained by automatically moving a window upon detection of the window position. In contrast to this, in the second embodiment, a proper stereoscopic vision is maintained by changing the contents of an image to be displayed after detection of the position of a window.

Figure 11:
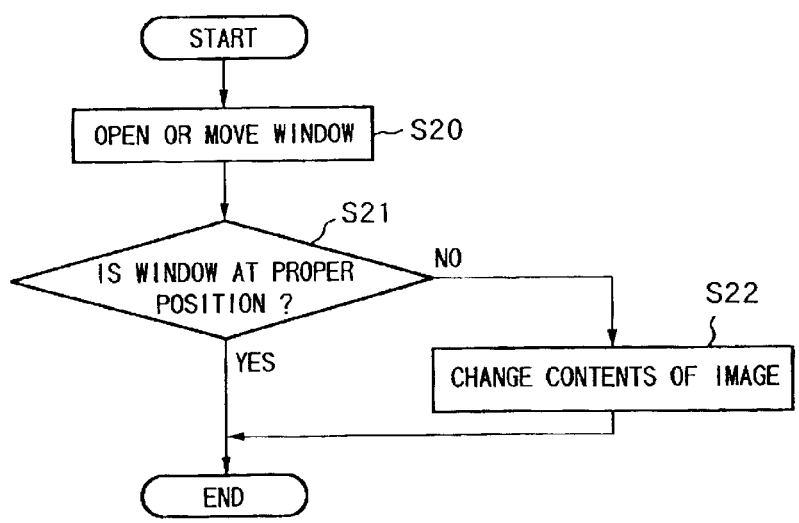
FIG. 11 is a flow chart showing an operation procedure performed by a host computer in the second embodiment of the present invention.

FIG. 11 is a flow chart showing an operation procedure performed by the host computer in the second embodiment. In step S20, the host computer 10 detects that a window for stereoscopic image display is opened or its position is moved. Opening or movement of a window is detected in the above manner. In step S21, the host computer 10 checks the position of the window to detect whether the window is at a position where a proper stereoscopic vision is realized. If the window position is at a proper position, the current state is maintained. If the window position is not at a proper position, the flow advances to step S22 to automatically change the contents of a displayed image.

Processing of changing the contents of the displayed image in step S22 will be described in detail next. FIGS. 12 to 16 explain how the contents of the displayed image within the window are changed.

When the displayed image is a vertically striped parallax image, one of the following changing operations is performed.

Figure 12:
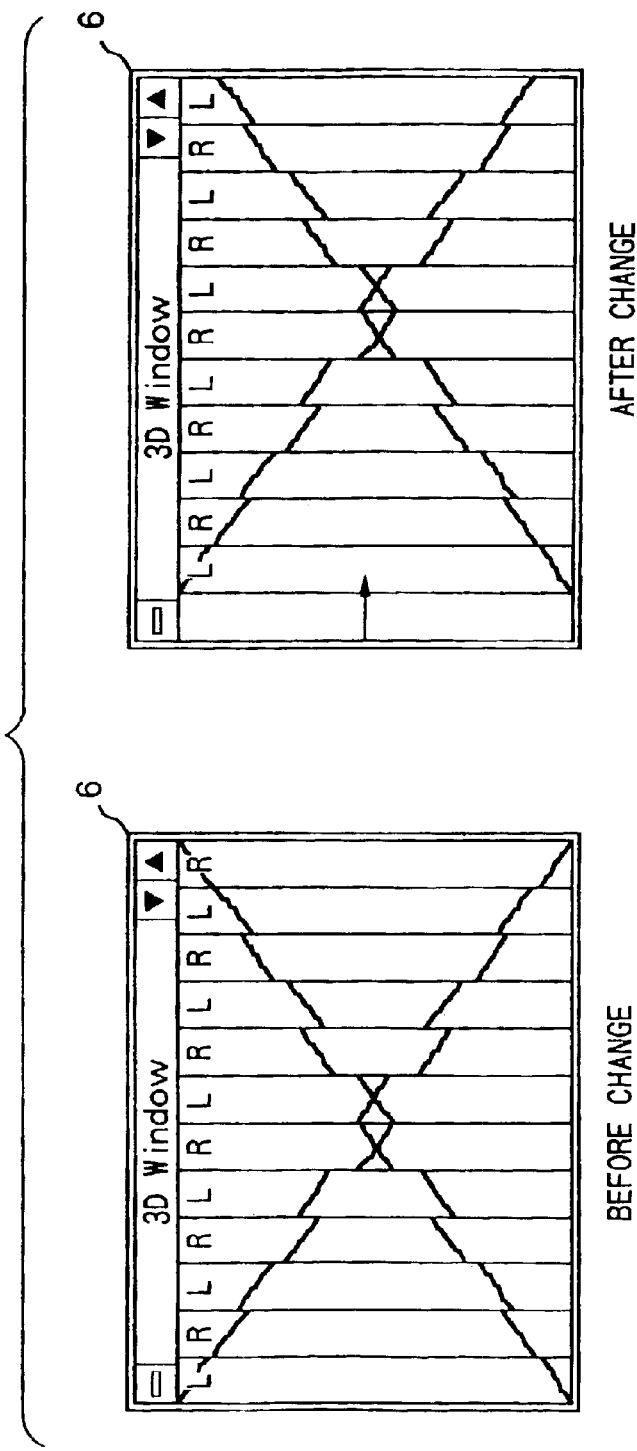
FIG. 12 is a view for explaining how the contents of a displayed image in a window are changed in the second embodiment.

(1) As shown in FIG. 12, the image in the window is moved to the right by one stripe pitch in the horizontal direction within the screen. Obviously, the image in the window may be moved to the left by one stripe pitch.

(2) The image is displayed upon interchange of the L and R areas.

In method (1), since the period of stripe images coincides with the minimum pixel pitch of an image display screen in most cases, the image is moved to the right or left by one pixel. In this case, the position of the window is not changed, but only the image in the window is moved.

Figure 13:
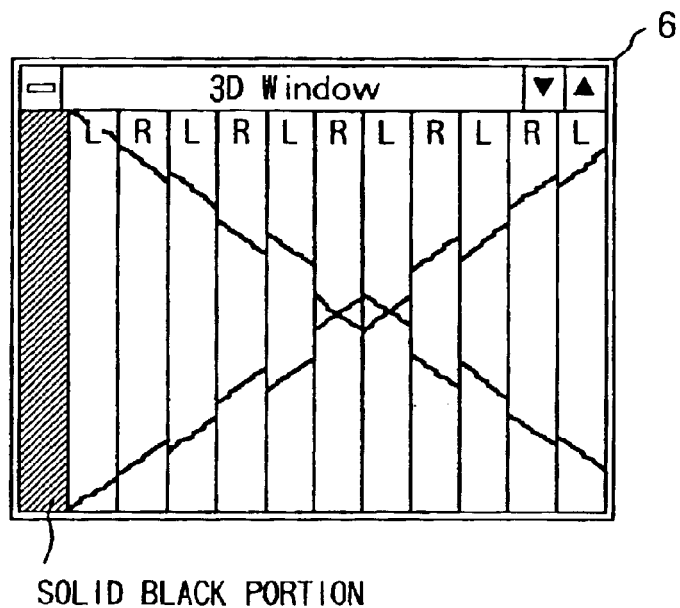
FIG. 13 is a view for explaining how the contents of a displayed image in a window are changed in the second embodiment.
Figure 14:
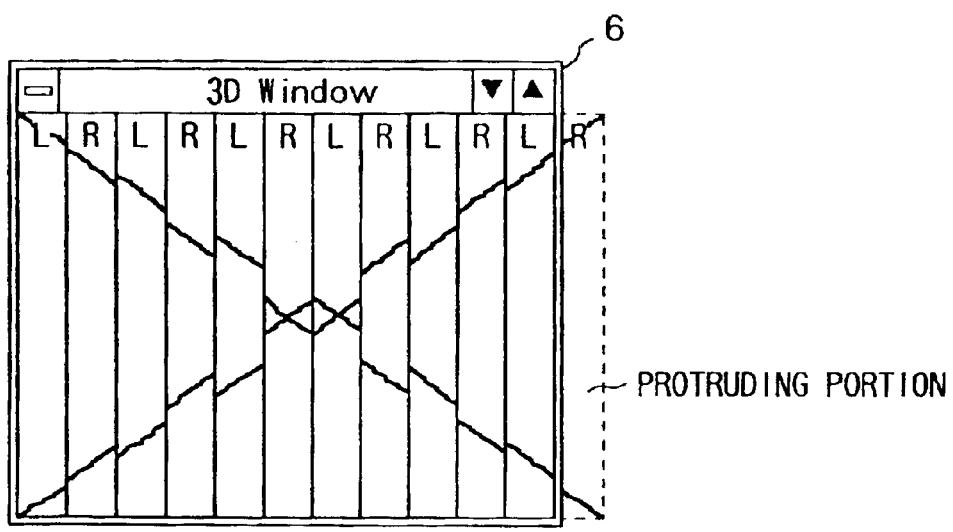
FIG. 14 is a view for explaining how the contents of a displayed image in a window are changed in the second embodiment.

When only the displayed image filling the window is moved, an area without any image data is inevitably displayed. In such a case, this area may be displayed as a solid black area, as shown in FIG. 13. Alternatively, as shown in FIG. 14, only an area smaller than the original striped image by one stripe in the horizontal direction is displayed in advance in the window, and the data in the area outside the window, which has not been displayed, is displayed when the image needs to be moved. In the case shown in FIG. 14, the image in the window is moved to the left.

In method (2), since the left and right images of the striped image are alternately arranged, the image is displayed upon interchanging the left and right stripes.

Figure 4:
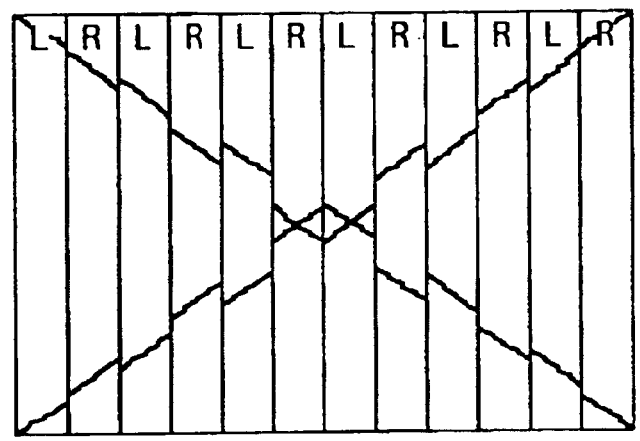
FIG. 4 is a view showing a vertically striped parallax image obtained by dividing the parallax images in FIGS. 2 and 3 into vertical stripes, and alternately arranging them.
Figure 5:
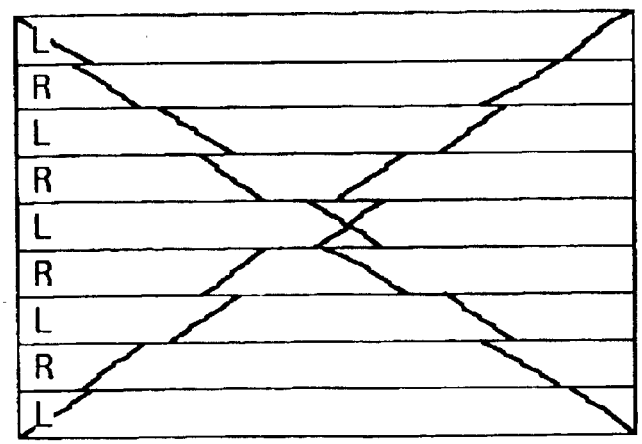
FIG. 5 is a view showing a horizontally striped parallax image obtained by dividing the parallax images in FIGS. 2 and 3 into horizontal stripes, and alternately arranging them.
Figure 15:
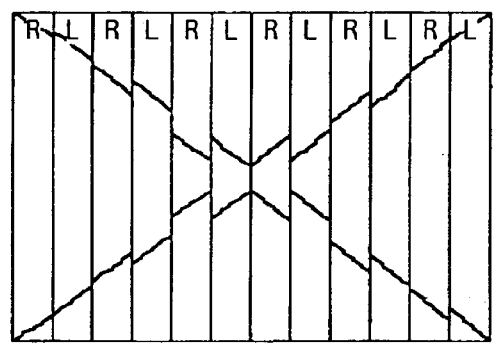
FIG. 15 is a view for explaining how the contents of a displayed image in a window are changed in the second embodiment.

When, for example, the left-eye image (FIG. 2) and the right-eye image (FIG. 3) are to be synthesized into a striped image, two types of images, i.e., the image in FIG. 4 and the image in FIG. 15, are generated by changing the order of right and left stripes. If, therefore, one of the images is displayed, and a reversed stereoscopic vision state occurs, a proper stereoscopic vision state can be set by interchanging one image and the other image.

When the display image is a horizontally striped parallax image, one of the following changing operations is performed.

Figure 16:
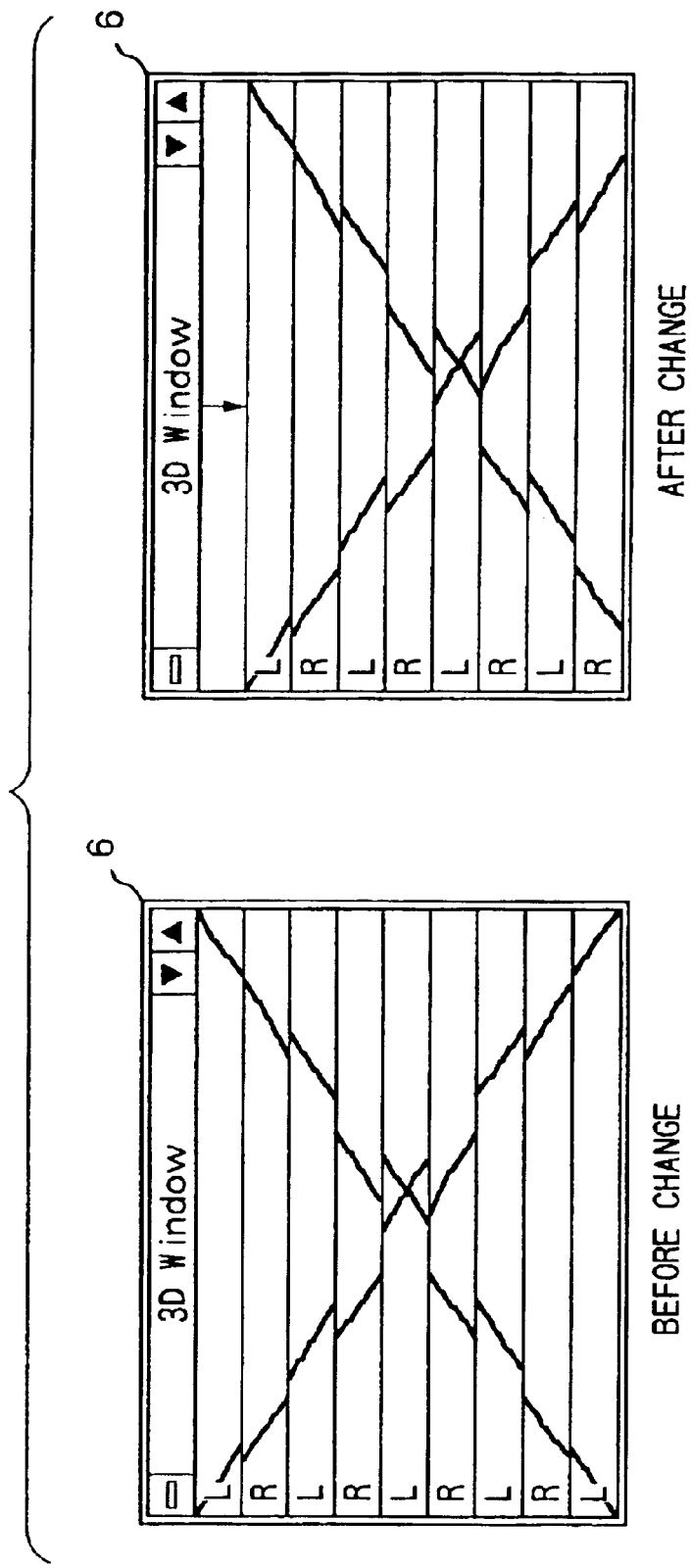
FIG. 16 is a view for explaining how the contents of a displayed image in a window are changed in the second embodiment.

(1) As shown in FIG. 16, the image in the window is moved by one stripe pitch in the vertical direction within the screen (up-and-down direction).

(2) The image is displayed upon interchanging the L and R areas.

Since the contents of the changing operations are the same as those in the case of the vertically striped parallax image, a detailed description thereof will be omitted.

In most cases, the contents of such a displayed image can be automatically changed by slightly moving the image. Therefore, the observer hardly recognize this movement.

According to this embodiment as well, therefore, there is provided a stereoscopic display which can automatically maintain a proper stereoscopic vision without attracting the observer's attention.

<Third Embodiment>

The third embodiment of the present invention will be described next. In the third embodiment as well, the present invention is applied to a stereoscopic display apparatus 20 which allows an observer to observe a stereoscopic image by using the parallax between the right and left eyes and a computer system including a host computer 10 for controlling the display apparatus.

In the first and second embodiments, a reversed stereoscopic vision is prevented by moving or changing a displayed image. In contrast to this, in the third embodiment, a stereoscopic vision state is maintained by changing the state of a directivity control means upon detection of the position of a window. The stereoscopic display used in the third embodiment is therefore designed to actively change the relative positional relationship between the image display surface and the directivity control means. In the parallax barrier scheme, for example, if the barrier unit has a mechanism for allowing the unit to mechanically move while keeping parallel to the screen, such a state change can be made. Alternatively, the electronic parallax barrier may be designed to change the stripe display positions.

Figure 17:
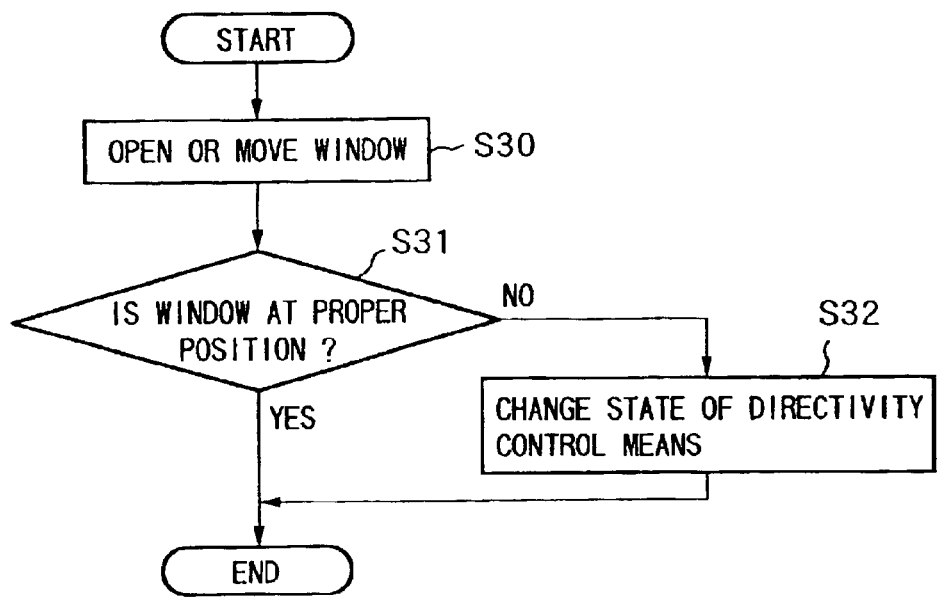
FIG. 17 is a flow chart showing a control procedure performed by a host computer in the third embodiment of the present invention.

FIG. 17 is a flow chart showing a control procedure performed by the host computer in the third embodiment. When the host computer 10 detects in step S30 that a window is opened or moved, the flow advances to step S31. In step S31, if it is determined on the basis of the position of the window after it is opened or moved that the window is a window to be subjected to stereoscopic image display, the host computer 10 checks the position of the window after it is opened or moved, and determines whether the window is at a position where a proper stereoscopic vision is obtained. If it is determined that the window is at the proper position, the host computer 10 continues the current state. Otherwise, the flow advances to step S32 to automatically change the state of the directivity control means.

The state of this directivity control means is changed as follows.

When the displayed image is a vertically striped parallax image, the directivity control means is moved to the right or left by one pitch of the periodic structure of the directivity control means in the horizontal direction within the screen. Note that the positions of the window and the image are not changed in this case.

When a stereoscopic display which can generate a striped barrier pattern at an arbitrary position on the display, as disclosed in Japanese Patent Laid-Open No. 5-122733, is used, since a directivity control means can be electronically generated at an arbitrary position, the above operation of changing the state of the directivity control means can be performed more easily.

As described above, in the third embodiment, the relative positional relationship between a parallax barrier and a striped parallax image is detected to automatically perform active control on the parallax barrier.

When the displayed image is a horizontally striped parallax image, the directivity control means is moved up or down by one pitch of the periodic structure of the directivity control means in the vertical direction within the screen. The contents of this changing operation are the same as those in the case of the vertically striped parallax image.

In most cases, the contents of such a displayed image can be automatically changed by slightly moving the image. Therefore, the observer hardly recognize this movement. According to this embodiment, similar to the first and second embodiments, therefore, there is provided a stereoscopic display which can automatically maintain a proper stereoscopic vision without attracting the observer's attention.

<Fourth Embodiment>

The fourth embodiment of the present invention will be described next. In the first to third embodiments, the position of a window, the contents of an image, and the state of the directivity control means are changed in accordance with the static window position. In the fourth embodiment, even when the position of a window dynamically changes, a proper stereoscopic vision state is maintained by performing the above state changing operations.

In general, when the cursor pointer of a mouse is placed on the title bar on the upper portion of a window and moved to a desired position in a clicked state, the window moves together with the cursor pointer as if the window is restrained by the movement of the mouse. An operation of moving a window together with the cursor pointer is called dragging. An operation of releasing a window by releasing the button at a proper position after dragging is called dropping.

Figure 18:
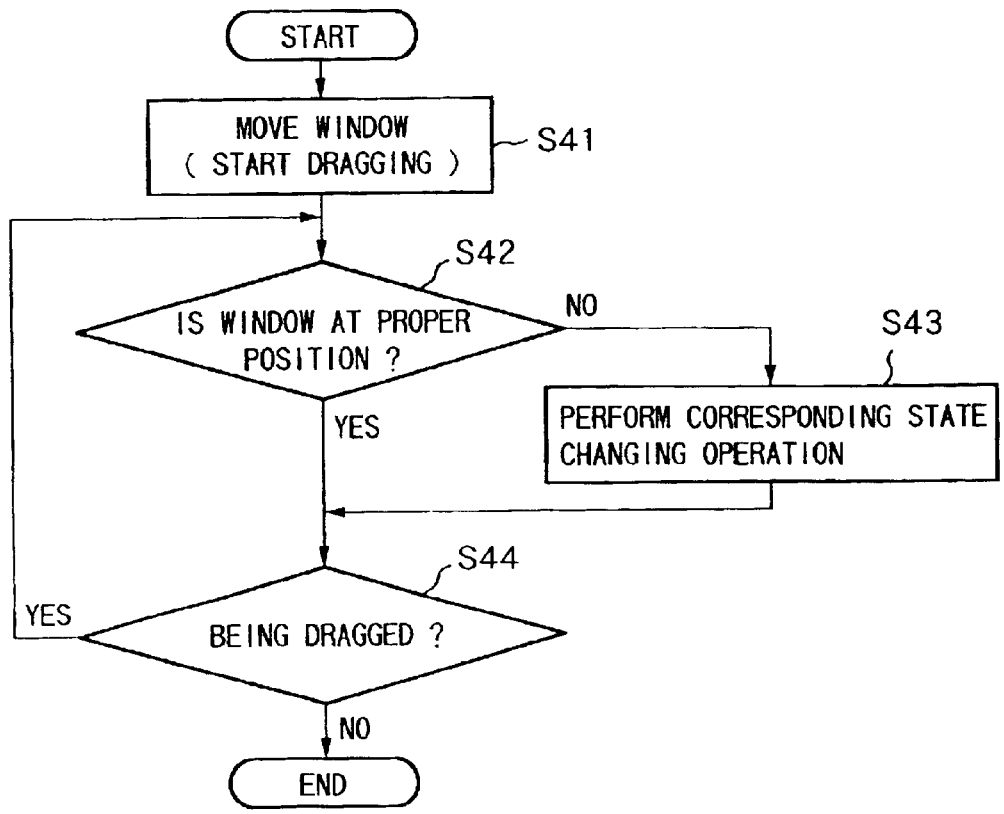
FIG. 18 is a flow chart showing a control procedure for preventing a reversed stereoscopic vision during a window dragging operation in the fourth embodiment of the present invention.

The position of a window dynamically changes in accordance with the movement of the cursor pointer while the window is dragged. This window and the image in the window may be kept displayed during this dragging operation. When, therefore, the image in the window is a striped parallax image, a reversed stereoscopic vision must also be prevented during dragging of the window by some means. FIG. 18 is a flow chart showing a control procedure for preventing a reversed stereoscopic vision during dragging of a window. When the start of the movement of a window by dragging is detected in step S41, it is checked in step S42 whether the current position of the window is a position where a proper stereoscopic vision can be realized. If YES in step S42, the flow advances to step S44.

If it is determined that the window is at a position where a reversed stereoscopic vision occurs, the flow advances to step S43 to execute a corresponding state changing operation. In this case, the "corresponding state changing operation" indicates finely changing the window position (first embodiment), changing the contents of the image in the window (second embodiment), or changing the state of the stereoscopic (third embodiment) which is described in the corresponding embodiment.

The flow then advances to step S44 to check whether the dragging operation is continued. If YES in step S44, the flow returns to step S42. If NO in step S44, this processing is terminated.

Although the basic policy of the above processing does not greatly differ from that in the first to third embodiment, it should be noted that detection of the position of a window, verification of the window position, and a corresponding state changing operation are performed at very high speed. This is because, the position of a window incessantly changes from proper stereoscopic vision position to improper positions while the window position dynamically changes owing to dragging, and the observer cannot continuously obtain a proper stereoscopic vision unless a corresponding state changing operation is performed to prevent a reversed stereoscopic vision every time the window position is set at an improper position. In this embodiment, therefore, the window detection period during dragging is set to be very short to complete verification of the window position and a corresponding state changing operation within a period of time shorter than the above period.

As described above, according to the fourth embodiment, there is provided a stereoscopic display which can automatically maintain a proper stereoscopic vision even while the observer is moving a window.

As described above, according to each embodiment described above, in the computer system including the stereoscopic display apparatus which allows the observer to observe a stereoscopic image by using the parallax between the right and left eyes, and the host computer for controlling the display apparatus, when several windows are opened on the screen, and stereoscopic images are displayed in the windows, the observer can always have a proper stereoscopic vision in a given window even if the position of the window changes.

In both the parallax barrier scheme and the lenticular scheme, position pixel unit width on the image display surface corresponds to the eye width of the observer. Since an image having a size of several μm is enlarged into an image having a size of several cm, a one-pitch shift of the displayed image as in the above embodiments greatly influences the optimal observation position. That is, adjustment by such a one-pitch shift is very effective.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As has been described above, according to the present invention, the position of a striped parallax image as a stereoscopic image displayed in a window can be set at a position suited to the display apparatus.

According to the present invention, therefore, when several windows are opened on the screen, and images are displayed in the windows as in the case of images handled in the computer, the observer can always have a proper stereoscopic vision in a given window even if the position of the window changes.

As many apparently widely different embodiments of the present invention can be made without departing from the spirit and scope thereof, it is to be understood that the invention is not limited to the specific embodiments thereof except as defined in the claims.

What is claimed is:

1. An image display system capable of performing stereoscopic display, comprising:
   stereoscopic image display means for displaying a stereoscopic image having stripe parallax images arranged for right and left eyes, wherein the stripe parallax images arranged for the right eye are displayed on first stripe areas of first display means and the stripe parallax images arranged for the left eye are displayed on second stripe areas of said first display means;

window setting means for setting a single window on a desired position of said first display means, in which a stereoscopic image comprised of stripe parallax images arranged for the right and left eyes is displayed;

stereoscopic vision control means for displaying a parallax barrier pattern on second display means such that stripe parallax images of the stereoscopic image displayed on the first and second stripe areas of said first display means are respectively observed with the right and left eyes; and changing means for, when the stripe parallax images arranged for the right and left eyes to be displayed in the single window are displayed on the second and first stripe areas respectively, changing the display position of the single window so as to display, on the first and second stripe areas in the single window respectively, the stripe parallax images arranged for the right and left eyes without change of the parallax barrier pattern.

2. The system according to claim 1, wherein said changing means shifts the position of the single window by a distance corresponding to a stripe pitch of the stripe parallax image in a direction of stripe width of the stripe parallax image.

3. The system according to claim 2, wherein an amount of shift of the position of the single window is equal to a minimum pixel pitch of said first display means.

4. The system according to claim 2, wherein the stripe parallax image displayed on said first display means is comprised of a horizontal stripe parallax image, and a direction in which the position of the single window is shifted is a vertical direction.

5. The system according to claim 2, wherein the stripe parallax image displayed on said first display means is comprised of vertical stripe parallax images, and a direction in which the position of the single window is shifted is a horizontal direction.

6. The system according to claim 1, wherein said changing means is executed after the single window is opened and stripe parallax images are displayed therein or the single window is moved.

7. The system according to claim 1, wherein said changing means is executed at respective positions between movements of the single window while the single window is moved.

8. The system according to claim 7, wherein an execution period of said changing means is shortened while the single window is moved.

9. A method of controlling an information display system having stereoscopic image display means for displaying a stereoscopic image obtained by arranging stripe parallax images corresponding to the right and left eyes of an observer, wherein the stripe parallax images arranged for the right eye are displayed on first stripe areas of a first display and the stripe parallax images arranged for the left eye are displayed on second stripe areas of the first display, and stereoscopic vision control means for displaying a parallax barrier pattern on a second display to allow the observer to observe stripe parallax images of the stereoscopic image displayed on the first and second stripe areas of the first display with right and left eyes, respectively, comprising the steps of:

setting a single window on a desired position of the first display of a stereoscopic image display, in which a stereoscopic image comprised of stripe parallax images arranged for the right and left eyes is displayed; and when the stripe parallax images arranged for the right and left eyes to be displayed in the single window are displayed on the second and first stripe areas respectively, changing the display position of the single window so as to display, on the first and second stripe areas respectively, the stripe parallax images arranged for the right and left eyes without change of the parallax barrier pattern.

10. A storage medium storing a computer program for performing image display by using an image display apparatus having a first display, a second display and stereoscopic vision control means, the stereoscopic vision control means displays a parallax barrier pattern on said second display to allow an observer to observe stripe parallax images of a stereoscopic image with right and left eyes, displayed on first and second areas of the first display respectively, said computer program comprising:

a code for generating image data including a single window to be located on a desired position of the first display of the image display apparatus, in which stripe parallax images corresponding to the right and left eyes are arranged to display a stereoscopic image;

a code for determining whether a relative positional relationship between the generated stereoscopic image displayed in the single window and the parallax barrier pattern displayed by the stereoscopic vision control means of the image display apparatus is a proper positional relationship which allows a proper stereoscopic vision by checking whether the stripe parallax images arranged for the right and left eyes are displayed on the first and second areas of the first display respectively; and a code for adjusting, when the single window is displayed on the first display and it is determined that the positional relationship is not proper, the relative positional relationship to allow a proper stereoscopic vision by shifting the stripe parallax images so that the stripe parallax images arranged for the right and left eyes are displayed in the first and second areas, respectively, without change of the parallax barrier pattern.

11. An image display system capable of performing stereoscopic display, comprising:

stereoscopic image display means for displaying a stereoscopic image having stripe parallax images arranged for right and left eyes on first display means, wherein the stripe parallax images arranged for a right eye are displayed on a first stripe area of said first display means and the stripe parallax images arranged for a left eye are displayed on second stripe area of said first display means;

stereoscopic vision control means for displaying a parallax barrier pattern on a second display means such that stripe parallax images of the stereoscopic image displayed on the first and second areas of said first display means are respectively observed with the right and left eyes;

instruction means for instructing to display a new stereoscopic image on a desired position of said first display means; and display control means for displaying the new stereoscopic image on said first display means so that an observer can obtain a proper stereoscopic vision of the new stereoscopic image, with said display control means comprising:

determination means for determining whether a relative positional relationship between the stereoscopic image displayed in a single window generated by generating means and the parallax barrier pattern displayed by said stereoscopic vision control means is a proper positional relationship which allows a proper stereoscopic vision by checking whether the stripe parallax images arranged for the right and left eyes are displayed on the first and second areas of said first display means respectively; and adjustment means for, when it is determined that the positional relationship is not proper, adjusting the relative positional relationship to allow a proper stereoscopic vision by shifting the stripe parallax images so that the stripe parallax images arranged for the right and left eyes are displayed in the first and second areas, respectively, without change of the parallax barrier pattern.

12. The system according to claim 11, wherein said display control means displays the new stereoscopic image in a single window opened on said first display means.

13. The system according to claim 12, wherein said display control means adjusts the display position of the new stereoscopic image in the single window by shifting the single window by one stripe pitch of the stripe parallax images.

14. The system according to claim 12, wherein said display control means is executed after the single window is opened and the new stereoscopic image is displayed therein and/or after the single window is moved.

15. A method of controlling an image display system having stereoscopic image display means for displaying a stereoscopic image having stripe parallax images arranged for right and left eyes, wherein the stripe parallax images arranged for the right eye are displayed on first stripe areas of a first display and the stripe parallax images arranged for the left eye are displayed on second stripe areas of said first display, and stereoscopic vision control means for displaying a parallax barrier pattern on a second display such that parallax stripe images of a stereoscopic image displayed on the first and second areas of said first display are respectively observed with the right and left eyes, said method comprising the steps of:

instructing to display a new stereoscopic image on a desired position of the first display; and displaying the new stereoscopic image on the first display so that an observer can obtain a proper stereoscopic vision of the new stereoscopic image, with the display step including the substeps of:

determining whether a relative positional relationship between the stereoscopic image displayed in a single window generated by generating means and the parallax barrier pattern displayed by the stereoscopic vision control means is a proper positional relationship which allows a proper stereoscopic vision by checking whether the stripe parallax images arranged for the right and left eyes are displayed on the first and second areas of said first display respectively; and adjusting, when it is determined that the positional relationship is not proper, the relative positional relationship to allow a proper stereoscopic vision by shifting the stripe parallax images so that the stripe parallax images arranged for the right and left eyes are displayed in the first and second areas, respectively, without change of the parallax barrier pattern.

16. The method according to claim 15, wherein the display control step displays the new stereoscopic image in a single window opened on said first display.

17. The method according to claim 16, wherein the display control step adjusts the display position of the new stereoscopic image in the single window by shifting the single window by one stripe pitch of the stripe parallax images.

18. The method according to claim 16, wherein the display control step is executed after the single window is opened and the new stereoscopic image is displayed therein and/or after the single window is moved.

19. An image display system capable of performing stereoscopic display, comprising:

stereoscopic image display means for displaying a stereoscopic image having a stripe parallax image arranged for right and left eyes, wherein the stripe parallax images arranged for the right eye are displayed on first stripe areas of first display means and the stripe parallax images arranged for the left eye are displayed on second stripe areas of said first display means;

window setting means for setting a single window on a desired position of said first display means, in which a stereoscopic image comprised of stripe parallax images arranged for the right and left eyes is displayed;

stereoscopic vision control means for displaying a parallax barrier pattern on second display means such that stripe parallax images of the stereoscopic image displayed on the first and second stripe areas of said first display means are respectively observed with the right and left eyes; and changing means for, when the stripe parallax image arranged for the right and left eyes to be displayed in the single window are displayed on the second and first stripe areas respectively, changing the display position of the stripe parallax images arranged for the right and left eyes in the single window so as to display, on the first and second stripe areas respectively, the stripe parallax image arranged for the right and left eyes to be displayed in the single window, without change of the parallax barrier pattern.

20. The system according to claim 19, wherein said changing means shifts the display position of the stripe parallax image in the single window by a distance corresponding to a stripe pitch of the stripe parallax image in a direction of the stripe parallax image.

21. The system according to claim 20, wherein an amount of shift of the stripe parallax image in the single window is equal to a minimum pixel pitch of said first display means.

22. The system according to claim 20, wherein the stripe parallax image displayed on said first display means is constituted by a horizontal stripe parallax image, and a direction in which the display position of the stripe parallax images in the single window is shifted is a vertical direction.

23. The system according to claim 20, wherein the stripe parallax image displayed on said first display means is constituted by vertical stripe images, and a direction in which the display position of the stripe parallax images in the single window is shifted is a horizontal direction.

24. The system according to claim 23, wherein said changing means is executed after the single window is opened and stripe parallax images are displayed therein or the single window is moved.

25. The system according to claim 23, wherein said changing means is executed at respective positions between movements of the single window while the single window is moved.

26. The system according to claim 25, wherein an execution period of said changing means is shortened while the single window is moved.

* * * * *

UNITED STATES PATENT AND TRADEMARK OFFICE
CERTIFICATE OF CORRECTION

| | |
|---|---|
| PATENT NO. | : 7,030,903 B2 |
| APPLICATION NO. | : 09/025856 |
| DATED | : April 18, 2006 |
| INVENTOR(S) | : Toshiyuki Sudo |

It is certified that error appears in the above-identified patent and that said Letters Patent is hereby corrected as shown below:

COLUMN 16:

Line 55, "claim 23," should read --claim 19,--.
Line 59, "claim 23," should read --claim 19,--.

Signed and Sealed this

Twelfth Day of December, 2006

JON W. DUDAS
*Director of the United States Patent and Trademark Office*